United States Patent
Karaoglu et al.

(10) Patent No.: US 6,361,875 B1
(45) Date of Patent: Mar. 26, 2002

(54) PREMIUM HAND WRAP MULTI-LAYER FILM PRODUCTS

(75) Inventors: Azmi Karaoglu, Wayne, NJ (US); Dennis J. Kalz, Danville, VA (US)

(73) Assignee: Intertape, Inc., Danville, VA (US)

( * ) Notice: Subject to any disclaimer, the term of this patent is extended or adjusted under 35 U.S.C. 154(b) by 0 days.

(21) Appl. No.: 09/584,683

(22) Filed: May 31, 2000

Related U.S. Application Data

(60) Provisional application No. 60/166,689, filed on Nov. 20, 1999.

(51) Int. Cl.$^7$ ................................................ B32B 27/08
(52) U.S. Cl. ........................ 428/515; 428/516; 428/213
(58) Field of Search ................................ 428/515, 516, 428/213

(56) References Cited

U.S. PATENT DOCUMENTS

| | | | |
|---|---|---|---|
| 4,833,024 A | 5/1989 | Mueller | 428/349 |
| 4,865,902 A | 9/1989 | Golike et al. | 428/215 |
| 5,023,143 A | 6/1991 | Nelson | 428/516 |
| 5,902,684 A | 5/1999 | Bullard et al. | 428/515 |
| 5,907,942 A | 6/1999 | Eichbauer | 53/441 |
| 5,907,943 A | 6/1999 | Eichbauer | 53/441 |
| 6,045,882 A | * 4/2000 | Sandford | 428/34.9 |
| 6,074,715 A | * 6/2000 | Lind et al. | 428/35.4 |

* cited by examiner

*Primary Examiner*—Paul Thibodeau
*Assistant Examiner*—Monique R. Jackson
(74) *Attorney, Agent, or Firm*—Roberts Abokhair & Mardula, LLC.

(57) ABSTRACT

The present invention provides improved multi-layer hand wrap stretch film products. The products comprise at least five layers. The first and second outer layers each represent from 10 to 25 percent by weight of the film and comprise a blend of a linear low density polyethylene, and a metallocenes based linear low density polyethylene. The film includes a first and second inner layer where each represents from 20 to 40 percent by weight of the film and comprises a blend of linear low density polyethylene and a low density polyethylene. The core layer represents from 10 to 30 percent by weight of the film and comprises linear low density polyethylene. The linear low density polyethylene components are either single products or blends of products. The final film exhibits improved properties needed in hand wrap films such as puncture resistance and load retention. Polyisobutylenes are optionally added to at least one of the outer layer in an amount sufficient to enhance the cling force of the applicable outer layer.

11 Claims, No Drawings

PREMIUM HAND WRAP MULTI-LAYER FILM PRODUCTS

RELATED APPLICATIONS

This application claims priority from provisional patent application No. 60/166,689 filed on Nov. 20, 1999, by Azmi Karaoglu (Kay). The provisional application is incorporated herein by reference, in its entirety, for all purposes.

BACKGROUND

The present invention is directed to stretch wrap films and methods for their use. In particular, the present invention is directed to stretch wrap films having excellent maximum stretch, excellent holding force, superior puncture resistance, high total energy dart drop, high cling force and overall strength. The films of the present invention are particularly useful in hand wrapping applications.

The use of thermoplastic stretch wrap films for the overwrap packaging of goods, and in particular, the unitizing of palleted loads is a significant commercially important application of polymer film, including generically, polyethylene and other polyolefins.

Over-wrapping a plurality of articles to provide a unitized load can be achieved by a variety of techniques. In addition to machine wrapping, these products are utilized in hand wrapping operations. Pallets can be hand wrapped quickly, safely and economically. Hand wrapping is particularly useful in wrapping irregular or non-uniform pallets and articles. Hand wrap films exhibit toughness sufficient to hold the article. The industry also utilizes narrow width hand wrap films. These offer an alternative to adhesive based wrapping films, tape, twine, strapping or glue. The hand wrap films need to exhibit excellent cling force, but only to the film itself and not to the wrapped article. The hand wrap operations offer affordable, easy to use means of keeping loads clean, damage free and safe from pilferage. The hand wrap films should also exhibit excellent puncture and tear resistance.

Hand wrapping large pallets is finding acceptance in industry today. In this method, the film is arranged on a roll, however, it is hand held by the operator who walks around the goods to be wrapped, applying the film to the goods. The operator may install the roll of film so used on a hand-held wrapping tool for ease of use.

Some of the properties desired of a good stretch wrap film for hand wrapping are as follows: good cling or cohesion properties, high puncture resistance, good machine direction tear resistance, good transparency, low haze, low stress relaxation with time, high resistance to transverse tear especially when under machine direction tension, producible in thin gauges, low specific gravity and thus high yield in area per pound, good tensile toughness, high machine direction ultimate tensile strength, high machine direction ultimate elongation, and low modulus of elasticity.

Currently, different grades of stretch wrap films are commonly marketed for different end uses according to overall film properties. For example, certain stretch wrap films have superior properties for load retention, but these films are characterized by having poor stretching characteristics. On the other hand, certain stretch wrap films having superior stretching properties have low load retention properties, thus limiting their use. Some of the broader categories include: general purpose hand wrap films, heavy duty hand wrap films, and special formulation hand wrap films.

A need exists to develop premium grade hand wrap stretch films. These films are particularly suitable for applications requiring minimum "neck-down" and a stiff feel. The products should provide good load retention characteristics and excellent stretching characteristics while still maintaining other important stretch film properties. Such films are used in premium or heavy duty applications.

Accordingly, the present invention provides for multi-layer films for hand wrap stretch applications including stretch wrap films. The preferred resultant film has five layers with each layer being a blend of components to achieve the desired improved results.

In accordance with the present invention, attention has been focused on developing higher performance hand wrap stretch films, while maintaining cost efficient production capabilities. Performance enhancements include improvement of load retention, tear resistance in machine direction (MD) and transverse direction (TD), puncture resistance, ultimate elongation, and overall strength. Desired properties of a "good" hand wrap stretch film are good cling or cohesion properties, good tear resistance in MD and TD directions, good clarity (low haze), high ultimate elongation, high tensile values, good stiffness (modulus), and high yield per pound.

SUMMARY

The present invention is directed to co-extruded films comprised of at least 5-layers construction that are used for hand wrap film applications or premium grade stretch film applications. In one embodiment, these multi-layer stretch wrap films are manufactured as cast films with conventional co-extrusion methods. Each of the five layers comprises a single polyolefin polymer or a mixture of polymers. When a mixture of polymers is utilized in a single layer, the polymers are introduced into an extruder to be mixed and extruded as a single layer. In one embodiment, the multi-layer film comprises a first outer layer, a first inner layer, a core layer, a second inner layer and a second outer layer. Each of the first and second outer layers comprises a blend of linear low density polyethylene, and a metallocenes based linear low density polyethylene. Each of the first and second inner layers comprises a blend of linear low density polyethylene and a low density polyethylene. The core layer comprises linear low density polyethylene products. The core layer preferably comprises a blend of different linear low density polyethylene components. In another embodiment, the first and second outer layers comprise blends of different linear low density polyethylene components. In yet another embodiment, a linear low density polyethylene butene copolymer is utilized in each of the layers.

Another embodiment of the present invention provides a multi-layer film comprising at least a first outer layer, a first inner layer, a core layer, a second inner layer and a second outer layer. The first outer layer represents from 10 to 25 percent by weight of the film and comprises a blend of linear low density polyethylene, and a metallocenes based linear low density polyethylene. A first inner layer represents from 20 to 40 percent by weight of the film and comprises a blend of linear low density polyethylene and a low density polyethylene. A core layer represents from 10 to 30 percent by weight of the film and comprises linear low density polyethylene products. A second inner layer represents from 20 to 40 percent by weight of the film and comprises a blend of linear low density polyethylene and a low density polyethylene. A second outer layer represents from 10 to 25 percent by weight of the film and comprises a blend of linear low density polyethylene, and a metallocenes based linear low density polyethylene.

In another five layer film product of the present invention, each of the outer layers represents from 10 to 25 percent by weight of the film and each comprises a blend of 50 to 80 percent by weight of a first linear low density polyethylene product, 10 to 40 percent by weight of a second linear low density polyethylene product, and 3 to 17 percent by weight of a metallocenes based linear low density polyethylene product. Each of the inner layers represents from 20 to 40 percent by weight of the film and each comprises a blend of 85 to 96 percent by weight of linear low density polyethylene product and from 4 to 15 percent by weight of a low density polyethylene product. A core layer represents from 10 to 30 percent by weight of the film and comprises linear low density polyethylene products. Preferably, a linear low density polyethylene butene copolymer is utilized in each of the layers. In another preferred variation, the core layer comprises a blend of different linear low density polyethylene components. Most preferably, the core layer comprises a blend of at least two linear low density polyethylene products where the first is a hexene copolymer and the second is a butene copolymer. In one embodiment, the first and second inner layers each comprises a blend of a linear low density polyethylene butene copolymer product and a low density polyethylene homopolymer product having a fractional melt index. This blend comprises from 85 to 96 percent by weight of the linear low density polyethylene product and from 4 to 15 percent of the low density polyethylene product.

Another embodiment of the present invention provides a multi-layer film comprising two outer layers, two inner layers and a core layer. A first outer layer represents from 15 to 20 percent by weight of the film and comprises a blend of 60 to 70 percent by weight of a linear low density polyethylene hexene copolymer, 20 to 30 percent by weight of a linear low density polyethylene butene copolymer, and 5 to 15 percent by weight of a metallocenes based linear low density polyethylene product. A first inner layer represents from 30 to 35 percent by weight of the film and comprises a blend of from 85 to 96 percent by weight of a linear low density polyethylene butene copolymer, and from 4 to 15 percent by weight of a low density polyethylene homopolymer product. A core layer represents from 15 to 20 percent by weight of the film comprises a blend of from 20 to 30 percent by weight of a linear low density polyethylene hexene copolymer, and from 70 to 80 percent by weight of a linear low density polyethylene butene copolymer. A second inner layer represents from 30 to 35 percent by weight of the film and comprises a blend of from 85 to 96 percent by weight of a linear low density polyethylene butene copolymer, and from 4 to 15 percent by weight of a low density polyethylene homopolymer product. A second outer layer represents from 15 to 20 percent by weight of the film and comprises a blend of 60 to 70 percent by weight of a linear low density polyethylene hexene copolymer, 20 to 30 percent by weight of a linear low density polyethylene butene copolymer, and 5 to 15 percent by weight of a metallocenes based linear low density polyethylene product. Preferably, the linear low density polyethylene butene copolymer in each layer is the same polymer. Such a polymer has a melt index from 1.7 to 2.3 g/10 min. and a density of from 0.915 to 0.9198 grams per cubic centimeter.

In another embodiment of the present invention, a cling agent is added to one or both of the outer layers. Polybutenes and particularly polyisobutylenes are preferred cling agents. Such agents are added to one or both of the outer layers in amounts from about 0.1 to 2.0 % of the total weight of the final film.

DETAILED DESCRIPTION

The film products of the present invention provide improved heavy duty or premium hand wrap stretch film for load containment or product protection. Such films are utilized in various applications for hand wrapping products. Hand wrapping provides more flexibility and is less costly than machine wrapping. For example, hand wrapping films are utilized in the floor covering and tile industry. Carpet remnants are rolled and wrapped with hand wrap films instead of tape or cordage. The hand wrap films are cleaner to use and the wrap retains product visibility while eliminating possible damage or residue from adhesive tape. The non-porous film clings to itself and can be written on with a marker with no danger of the ink bleeding through. The film is also utilized to secure shipping labels and, unlike tape, retains its strength and flexibility without yellowing over time. Removal of the film is quick and simple and does not require the use of a knife or cutter. Such films are also used to hand wrap pallets of various shapes, tiles, paper products, phone books for delivery, and the like. Since the film adheres only to itself, the removal of the film does not leave adhesive residue or marred finishes. Removal of the film will not tear off the printed surface of a package.

These films are usually manufactured in a cast film process and cover a wide range of applications. The applications include general load unitization, long-range load hauling, and bar code scanning applications. The films of the present invention provide products with quiet unwind characteristics and effective load containment over a wide range of prestretch levels.

As used herein the terms "metallocenes based linear low density polyethylene" and "metallocenes based linear low density polyethylene product" both designate a low polydispersity, linear, low density polyethylene produced using metallocene catalysts and are further designated as mLLDPE. Suitable mLLDPEs are further described below.

In one embodiment of the present invention, the film comprises five layers where each of the five layers comprises a single type of polyolefin polymer or a mixture of various polymers as shown in the table below. When a mixture of polymers is utilized in a single layer, the polymers are introduced into an extruder to be mixed and extruded as a single layer. The premium hand wrap stretch film construction comprises the utilization of five layers of the following compositions. The outer layers comprise linear low density polyethylene (LLDPE), and metallocene based linear low density polyethylene (mLLDPE). These outer layers are present in the final film product in amounts ranging from 10 to 25 percent by weight each. Each of the inner layers (not the core layer) comprises LLDPE, and low density polyethylene (LDPE). Each of the inner layers represents from about 20 to about 40 percent by weight of the total film. The core layer comprises LLDPE and is present in an amount from 10 to 30 percent by weight of the final film product.

TABLE I

| Layer | Amount (wt %) | Make-up |
| --- | --- | --- |
| A | 10%–25% | LLDPE, mLLDPE |
| B | 20%–40% | LLDPE, LDPE |
| C | 10%–30% | LLDPE |
| B | 20%–40% | LLDPE, LDPE |
| A or D | 10%–25% | LLDPE, mLLDPE |

In one embodiment of the invention, the outer layer A comprises a blend of LLDPE products and mLLDPE products. Suitable LLDPE products are hexene copolymers having a density of from 0.915 to 0.9198 grams per cubic centimeter (g/cm$^3$) and a melt index of 1.5 to 2.5 (g/10 min.). Most preferably, the LLDPE product has a melt index of from 1.72 to 2.28 g/10 min. and a density of 0.916 to 0.918. This LLDPE product is preferably present in amounts ranging from 50 to 80 percent by weight and preferably from 60 to 70 percent of the outer layer. Such products are available from various vendors including Exxon Chemical (ESCORENE® LL-3002) and Union Carbide Corporation (TUFLIN® HS-7002). These products are utilized in the blend of the outer layer to provide good tensile properties as well as stiffness and toughness to the resulting film product.

In a preferred embodiment, each of the outer layers comprises a blend of at least two LLDPE products. The first LLDPE component (A-LLDPE-1) is selected from the group of LLDPE products discussed above. The second LLDPE component (A-LLDPE-2) is selected from LLDPE products that are butene copolymers. Preferably, such products have a melt index of from 1.5 to 2.5 g/10 min. and a density of from about 0.916 to 0.9198. Such products are available from various vendors. For example, Exxon product ESCORENE® LL-1002.32 is suitable for this application. This product has a target melt index of 2.0 g/10 min., density of 0.918 g/cc and a melting point of 249° F. (121C.). This second LLDPE component is present in the outer layer in amounts ranging from about 10 to 40 percent by weight of the outer layer. Preferably, the A-LLDPE-2 component is present in an amount of from 20 to 30 percent by weight of the outer layer. This component provides good tensile and toughness properties with good draw down capability, thus permitting down gauging.

The mLLDPE products are known in the art as the products made with a new generation of catalysts known as metallocenes. Methods of manufacturing these products will be discussed below. These products are available from various vendors, including Exxon Chemical (Exxon) and Dow Chemical Company (Dow). Suitable mLLDPE products for blending in the outer layers include those products having a density of 0.910 to 0.918 g/cc and a melt index of from about 3.0 to 4.0 g/10 min. Preferably, the mLLDPE products have a density of 0.913 to 0.9168 g/cc and a melt index of from about 3.01 to 3.99 g/10 min. Suitable products within the required parameters include octene copolymers. For example, Dow ELITE® 5220 is a suitable product exhibiting a density of 0.9150 g/cc and a melt index of 3.5 g/10 min. with a DSC melting point of 252° F. (122° C.). The mLLDPE component is present in amounts ranging from 3–17 percent by weight with 8–12 % being preferred and about 10% being most preferred.

In one preferred embodiment, the various components of the outer layers are present in the following amounts: A-LLDPE-1 represents 60–70 percent, A-LLDPE-2 represents 20–30 percent, and mLLDPE represents 5–15 percent. In a most preferred embodiment, the amounts are 65% of A-LLDPE-1, 25% of A-LLDPE-2, and 10% of mLLDPE.

The inner layers, shown as layers B in the table above, comprise a blend of low density polyethylene (LDPE) and LLDPE. The LLDPE component represents the majority of this layer with the LDPE present in minor amounts. Each of the inner layers B represents about 20 to 40 percent by weight of the total film. Most preferably, each of the inner layers represents 25–35 % by weight of the total film.

The LLDPE component is selected from the same class of the A-LLDPE-2 component of the outer layer A. This product is preferably the same product as used in the outer layers for the A-LLDPE-2 component. This LLDPE component represents the majority of the blend for the inner layer and is present in amounts ranging from 85 to 96 percent of the inner layer composition.

The LDPE component is selected from the group of low density polyethylene products having a fractional melt index. These are usually homopolymer products. It is preferred that the LDPE product have a melt index not greater than 0.90 g/10 min. Most preferably, LDPE products having melt index between 0.65 and 0.855 are selected. In one embodiment, the target melt index for the LDPE product selected for this component is 0.75 g/10 min. The density for this LDPE product is preferably between 0.910 and 0.930 g/cc. In one embodiment, the target density is 0.921 g/cc and may vary between 0.919 and 0.9228 g/cm$^3$. Suitable products are available from various vendors including Exxon Chemical. Exxon markets such a product under the designation ESCORENE® LD-140 products, for example, LD-140.09, with a target melt index of 0.75 g/10 min., a target density of 0.921 g/cm$^3$, and a target melting point of 225° F. (108° C.). These fractional melt LDPE products impart very good toughness to the ultimate film product. This component is present in the inner layer in small amounts representing from about 4 to 15 percent of the layer composition. Preferably the LDPE component represents from 7 to 9 percent of the layer composition.

In one embodiment, the LDPE component is present in an amount of about 8.1 percent and the LLDPE is present in an amount of about 91.9 percent of the inner layer composition.

The core layer comprises LDPE selected from the products suitable for use in the outer layers. In a preferred embodiment, the core layer comprises a blend of at least two LLDPE products. The first LLDPE component (C-LLDPE-1) is selected from the group of A-LLDPE-1 products used in the outer layer. The second LLDPE component (C-LLDPE-2) for the core layer is selected from the A-LLDPE-2 products that are butene copolymers. Preferably, such products have a melt index of from 1.5 to 2.5 g/10 min. and a density of from about 0.916 to 0.9198. Such products are available from various vendors. For example, Exxon product ESCORENE® LL-1002 is suitable for this application. This product has a target melt index of 2.0 g/10 min., density of 0.918 g/cc and a melting point of 249° F. (121° C.). The mixture comprises from about 10 to 40 percent by weight of C-LLDPE-1 and from 60 to 90 percent by weight of C-LLDPE-2. In one preferred embodiment the two components are present in a 25/75 mixture of C-LLDPE-1C-LLDPE-2. The core layer represents from 10 to 30, preferably from 15 to 20 percent by weight of the total film.

In the five layer film construction, in accordance with an embodiment of the present invention, the outer layers can be the same or different. When the outer layers are the same, the layer designation is shown as A-B-C-B-A. This also shows that the inner layers B are the same. Alternatively, the outer layers may be different with the layer designation shown as A-B-C-B-D. Layer D can vary but preferably comprises the same classes of components as in layer A In another embodiment of the present invention, layers B may be the same or different. Layers B may be different but preferably should comprise the same types of components. In such a case film designation is A-B$_1$-C-B$_2$-A or A-B$_1$-C-B$_2$-D. In yet another preferred embodiment, the same LLDPE butene component is uses in all layers. In another preferred embodiment, each layer comprises a minimum of 20% and a maximum of 96% of the same butene LLDPE component.

In one embodiment of the present invention, the co-extruded film structure is manufactured using a cast extrusion line in which the stretch film is extruded onto a cooled cast roller. In accordance with the invention, polymer composition for each layer, as described above, is fed through a blender or hopper to a series of extruders corresponding to each of the compositions. This blend of polymers is fed into 3 or 4 extruders and heated to a molten state in a manner consistent with conventional cast film co-extrusion processes. The stretch film of the invention can be manufactured by feeding polymer compositions for the various layers through the extruders at a combined rate of about 1000 to 2500 lbs./hr. (typical), under the following operating conditions:

| | | |
|---|---|---|
| A/D | 375° F.–540° F. | 218.75–437.5 lbs./hr. |
| B Layer | 375° F.–540° F. | max. 1625 lbs./hr. |
| C Layer | 375° F.–540° F. | max. 437.5 lbs./hr. |

The molten polymer is then conveyed to a "feed-block" that combines the molten materials and maintains the multi-layered co-extruded structure. The five contiguously extruded layers are deposited onto a cooled casting roll to form the stretch film. The layers, each extruded through a slot die at up to 550° F., come into contact with a cast roll cooled to a temperature within an approximate range of 40° F. to 90° F. A vacuum box and static pinning system is used to pin the melt exiting the die opening to the casting roll. The thickness or gauge of the film, as measured from one planar surface to the other planar surface, can run from 0.50 mils to 1.50 mils. The film is drawn down to the final gauge by varying the ratio of line speed (take-up) to feed speed (extruded). The film is carried downstream through a series of idler rollers to the winder where the film is slit, in line, to the finished product width and length. Film widths can range from 2 to 30 inches. (Width does not include core extension.) Length can range from 200 to 10,000 feet.

The films of the present invention are used to hand wrap articles such canned goods, food products, paints, tiles, and the like, pet supplies, automotive supplies (parts, motor oils, etc.), can liner industry, paper products, irregularly shaped products, beverage containers, and beverage bottles. Hand wrapping operations are applied where machine wrapping is not practical or economical. The gauges for such materials are typically between 0.5 mil to 1.2 mil. The desirable physical properties of these products are good clarity (low haze), good puncture and tear resistance (across the web and machine direction), and good cling or cohesion properties.

The above represents part of the products wherein the present invention films are useful. Other stretch wrap applications will be apparent to those skilled in the art.

The multilayer stretch wrap films of the present invention are constructed with at least one polymeric layer comprising a polymer resin having a low polydispersity (mLLDPE). The low polydispersity polymer may be prepared from a partially crystalline polyethylene resin that is a polymer prepared with ethylene and at least one alpha olefin monomer, e.g., a copolymer or terpolymer. The alpha olefin monomer generally has from about 3 to about 12 carbon atoms, preferably from about 4 to about 10 carbon atoms, and more preferably from about 6 to about 8 carbon atoms. The alpha olefin comonomer content is generally below about 30 weight percent, preferably below about 20 weight percent, and more preferably from about 1 to about 15 weight percent. Exemplary comonomers include propylene, 1-butene, 1-pentene, 1-hexene, 3-methyl-1-pentene, 4-methyl-1-pentene, 1-octene, 1-decene, and 1-dodecene.

The low polydispersity polymer generally has the characteristics associated with an LLDPE material, however it has improved properties as explained more fully below. The low polydispersity polymer defined herein will have a density of from about 0.88 to about 0.94 g/cc, preferably from about 0.88 to about 0.93 g/cc, and more preferably from about 0.88 to about 0.925 g/cc.

The average molecular weight of the copolymer can generally range from about 20,000 to about 500,000, preferably from about 50,000 to about 200,000. The molecular weight is determined by commonly used techniques such as size exclusion chromatography or gel permeation chromatography. The low polydispersity polymer should have a molecular weight distribution, or polydispersity, ($M_w$, $M_n$, "MWD") within the range of about 1 to about 4, preferably about 1.5 to about 4, more preferably about 2 to about 4, and even more preferably from about 2 to about 3. Such products are well known in the art and are discussed in U.S. Pat. Nos. 5,907,942; 5,907,943; 5,902,684; 5,752,362; 5,814,399; and 5,749,202. All of these patents and all the patents and references cited therein are hereby incorporated by reference in their entirety.

Useful low polydispersity polymers are available from, among others, Dow Chemical Company and Exxon Chemical Company, who are producers of single site or constrained geometry catalyzed polyethylenes. These resins are commercially available as the AFFINITY® and EXACT® polyethylenes (see Plastics World, p.33–36, January 1995), and also as the ELITE® ENHANCED POLYETHYLENE RESINS and EXCEED® line of resins. The manufacture of such polyethylenes, generally by way of employing a metallocene catalyst system, is set forth in, among others, U.S. Pat. Nos. 5,382,631, 5,380,810, 5,358,792, 5,206,075, 5, 183,867, 5,124,418, 5,084,534, 5,079,205, 5,032,652, 5,026,798, 5,017,655, 5,006,500, 5,001,205, 4,937,301, 4,925,821, 4,871,523, 4,871,705, and 4,808,561, each of which is incorporated herein by reference in its entirety for the purpose of US prosecution. These catalyst systems and their use to prepare such copolymer materials are also set forth in EP 0 600 425 A1 and PCT applications WO 94/25271 and 94/26816, each of which is also incorporated herein by reference in its entirety for the purpose of US prosecution. The low polydispersity polymers thus produced generally have a crystalline content in excess of at least 10 weight percent, generally in excess of at least 15 weight percent. In some of the tables herein, these products are identified with the small letter "m" in front of the polymer designation, such as mLLDPE.

The above patents and publications generally report that these catalysts contain one or more cyclopentadienyl moieties in combination with a transition metal.

In accordance with an embodiment of the present invention, cling additives are added to one or both of the outer layers in order to enhance the cling force of the film. Various cling additives have been utilized in cling film applications. These additives have been used with resins not inherently possessing cling properties. In accordance with an embodiment of the present invention, a small amount of cling additive is added to either one or both of the outer layers in order to enhance existing cling properties. Non-limiting examples of cling additives include, for example, such tackifiers as polybutene and low molecular weight polyisobutylene, preferably between 200–3000, most preferably 200–300. Other suitable tackifiers include polyterpenes, amorphous polypropylene, ethylene vinyl acetate copolymers, microcrystalline wax, alkali metal sulfosuccinates, and mono- and di- glycerides of fatty acids, such as glycerol monostearate, glycerol monooleate, sorbitan monolaurate, sorbitan monopalmitate, sorbitan monostearate and sorbitan monooleate. Preferably, the tackifier is polybutene or polyisobutylenes (PIB). Such products are available from various vendors. For example, BP Amoco sells a suitable PIB product under the designation of INDOPOL® H-300 or H-300H. Such products have a kinematic viscosity (ASTM D445, at 99° C. (210° F.)) of from 635 to 690 cSt. and a specific gravity (ASTM D1298 at 15.5° C. (60° F.)) of 0.893 to 0.910. Such cling agents are added in an amount from 0.1 to 2.0 percent by weight based on the total film weight. However, the cling additive is added only to one or both the outer layers. Preferred amounts of the cling additive range from 0.5 to 1.5 percent with 1.0 percent being most preferred.

The following components are shown as exemplary products used in each of the layers of the five layer film examples shown below. All the films shown below exhibited improved properties for their indicated field of use and as discussed above.

IT1 is a linear low-density polyethylene (LLDPE) product available from Exxon Chemical, Polymers Group. These products are hexene copolymers having the following target properties. These products are FDA approved for food contact except for cooking. This product meets the requirements set forth above for the outer layer LLDPE.

| | IT1 | | |
|---|---|---|---|
| Melt Index | ASTM D-1238 (E) | 2.0 g/10 min. | |
| Density | | 0.917 g/cc | |
| Melting Point | | 255° F. (124° C.) | |

Component IT3 is a polyethylene resin available from various sources such as Dow Chemical Company. The product has the following properties. This product is FDA approved for food contact. This product meets the requirements set forth above for the outer layer mLLDPE. This is also described above as the low polydispersity product.

| | IT3 | |
|---|---|---|
| Density (g/cc) | 0.9150 | D 792 |
| Melt Index (g/10 min) | 3.5 | D 1238 |
| DSC Melting Point | 252° F. (122° C.) | |

Component IT5 is an LLDPE designed for blown film applications. These products are ethylene butene copolymers. These products are available from various sources including Exxon Chemical and have the following properties. These products exhibit good tensile and toughness properties. These products are FDA approved for food contact at or below cooking temperatures. This product meets the requirements set forth above for the core layer C-LLDPE-2 component, A-LLDPE-2 of the outer layers, and the LLDPE component for the inner layers. This product is suitable for blending with other LLDPE products such as IT1.

| | IT5 | |
|---|---|---|
| Melt Index (g/10 min.) | 2.0 | D 1238 |
| Density (g/cc) | 0.918 | |
| Melting point | 249° F. (121° C.) | |

Component IT6 is an LDPE product that exhibits fractional melt index values and is used only in the inner layers of the present invention. This type of product is available from various vendors including Exxon Chemical. These products impart very good toughness to the ultimate film product.

| | IT6 | |
|---|---|---|
| Melt Index (g/10 min.) | 0.75 | D 1238 |
| Density (g/cc) | 0.921 | |
| Melting point | 225° F. (108° C.) | |

The following formulation was utilized to produce hand wrap products in various gauges in accordance with the present invention. Each of the film products represents a premium or heavy duty hand wrap stretch film product for commercial applications. The film products exhibited improved physical properties.

| Hand Wrap Film: All Gauges | | |
|---|---|---|
| LAYERS | % PER LAYER | RESIN |
| A - 17.5% | 65.00% | IT1 |
| | 25.00% | IT5 |
| | 10.00% | IT3 |
| B - 32.5% | 8.10% | IT6 |
| | 91.90% | IT5 |
| C - 17.5% | 25.00% | IT1 |
| | 75.00% | IT5 |
| B - 32.5% | 8.1% | IT6 |
| | 91.9% | IT5 |
| A or D - 17.5% | 65.00% | IT1 |
| | 25.00% | IT5 |
| | 10.00% | IT3 |

As can be seen from the above, the five layer film comprises two outer layers, two inner layers, and a core layer. The outer layers comprise from about 10–20 percent of the overall film. The outer layers may be the same or different. It is preferred that the outer layers are blends of products to achieve the desired results. The inner layers (as distinguished from the core layer) comprise from about 40–80% of the overall film. The inner layers may be the same or different. The core layer comprises from about 10–30% of the overall film.

The table below shows the physical properties of the 0.80 mil film shown above and produced in accordance with the present invention.

| TENSILE | | |
|---|---|---|
| Point at which film no longer behaves like a spring. | Tensile @ Yield (PSI) MD | 1202 |
| | *MD @ 100% | 2131 |
| | TD | 1154 |
| ULTIMATE TENSILE (psi) | | |
| Maximum Tensile Stress (Before breaking point) | MD | 6639 |
| | TD | 3305 |
| ELONGATION @ YIELD % | | |
| Increase in length at yield point. | MD | 8.2 |
| | TD | 7.6 |
| BREAK ELONGATION (%) | | |
| Increase in length @ break point. (Higher number-greater stretch. | MD | 552 |
| | TD | 871 |
| 1% SECANT MODULUS (psi) | | |
| Measure of stiffness. | MD | 19964 |
| | TD | 22711 |
| ELMENDORF TEAR | | |
| Force required to tear film. | MD (g) | 24 |
| | MD (g/mil) | 30 |
| | TD (g) | 524 |
| | TD (g/mil) | 659 |
| DART DROP | | |
| Measure of impact resistance. | (g) | 66 |
| | (g/mil) | 83 |
| GUAGE MIC (mils) | | |
| Thickness of film. | Average | 0.80 |
| | Low | 0.772 |
| | High | 0.82 |
| PUNCTURE | | |
| Length of probe at 200%. | Starting Prestretch % | 150 |
| | 3 INCH | P |
| LOAD RETENTION | | |
| Holding force. | Starting Prestretch % | 100 |
| | POUNDS | 27.4 |
| CLING | | |
| Measure of cling force. | Starting Prestretch % | 100 |
| | | 160 |
| PRE-STRETCH | | |
| Measure of stretch % before break occurs. | Average % | 416 |
| | Starting % | 250 |
| | Stretchforce (lbs) | 40 |

The data indicates that a film of the present invention exhibits a good balance of properties for the targeted applications.

While various examples have been given above to assist the illustration of the present invention, these examples are not intended to define the scope of the invention. As is clear to the person skilled in the art, various products and combinations of products are utilized in each of the layers within the limitations of the claims below.

What is claimed is:

1. A multi-layer stretch film comprising
   from 10 to 25 percent by weight of a first outer layer comprising a blend of 50 to 80 percent by weight of a first linear low density polyethylene product, 10 to 40 percent by weight of a second linear low density polyethylene product, and 3 to 17 percent by weight of a low polydispersity polymer product;
   from 20 to 40 percent by weight of a first inner layer comprising a blend of 85 to 96 percent by weight of linear low density polyethylene product and from 4 to 15 percent by weight of a low density polyethylene product;
   from 10 to 30 percent by weight of a core layer comprising linear low density polyethylene products;
   from 20 to 40 percent by weight of a second inner layer comprising a blend of 85 to 96 percent by weight of linear low density polyethylene product and from 4 to 15 percent by weight of a low density polyethylene product; and
   from 10 to 25 percent by weight of a second outer layer comprising a blend of 50 to 80 percent by weight of a first linear low density polyethylene product, 10 to 40 percent by weight of a second linear low density polyethylene product, and 3 to 17 percent by weight of a low polydispersity polymer product.

2. The multi-layer film of claim 1 where a linear low density polyethylene butene copolymer is utilized in each of the layers.

3. The multi-layer film of claim 1 where the core layer comprises a blend of a first linear low density polyethylene product and a second linear low density polyethylene product wherein the first linear low density polyethylene product is different than the second linear low density polyethylene product.

4. The multi-layer film of claim 1 where the first and second outer layers comprise blends of different components.

5. The multi-layer film of claim 1 where the first and second inner layers comprise blends of different components.

6. The multi-layer film of claim wherein the core layer comprises a blend of at least two linear low density polyethylene products and wherein one of the linear low density polyethylene products is a hexene copolymer and one of the linear low density polyethylene products is a butene copolymer.

7. The multi-layer film of claim 1 wherein the first and second inner layers each comprises a blend of a linear low density polyethylene butene copolymer product and a low density polyethylene homopolymer product having a fractional melt index and wherein the blend comprises from 85 to 96 percent by weight of the linear low density polyethylene product and from 4 to 15 percent of the low density polyethylene product.

8. The multi-layer film of claim 1 further comprising a polyisobutylenes in at least one of the outer layers in an amount from 0.8 to 1.2 percent by weight of the total film composition.

9. A multi-layer stretch film comprising
   a first outer layer representing from 15 to 20 percent by weight of the film and comprising a blend of
     60 to 70 percent by weight of a linear low density polyethylene hexene copolymer,
     20 to 30 percent by weight of a linear low density polyethylene butene copolymer, and
     5 to 15 percent by weight of a low polydispersity polymer product;
   a first inner layer representing from 30 to 35 percent by weight of the film and comprising a blend of
     from 85 to 96 percent by weight of a linear low density polyethylene butene copolymer, and
     from 4 to 15 percent by weight of a low density polyethylene homopolymer product;
   a core layer representing from 15 to 20 percent by weight of the film comprising a blend of from 20 to 30 percent by weight of a linear low density polyethylene hexene copolymer, and from 70 to 80 percent by weight of a linear low density polyethylene butene copolymer;

a second inner layer representing from 30 to 35 percent by weight of the film and comprising a blend of from 85 to 96 percent by weight of a linear low density polyethylene butene copolymer, and from 4 to 15 percent by weight of a low density polyethylene homopolymer product; and a second outer layer representing from 15 to 20 percent by weight of the film and comprising a blend of 60 to 70 percent by weight of a linear low density polyethylene hexene copolymer, 20 to 30 percent by weight of a linear low density polyethylene butene copolymer, and 5 to 15 percent by weight of a low polydispersity polymer product.

10. The multi-layer film of claim 9 wherein the linear low density polyethylene butene copolymer in each layer is the same polymer and wherein such polymer has a melt index from 1.7 to 2.3 g/10 min. and a density of from 0.915 to 0.9198 grams per cubic centimeter.

11. The multi-layer film of claim 9 further comprising a polyisobutylenes in at least one of the outer layers in an amount from 0.8 to 1.2 percent by weight of the total film composition.

* * * * *